Oct. 30, 1951            G. M. SCOTT            2,573,498
WALL PLUG
Filed Feb. 1, 1946
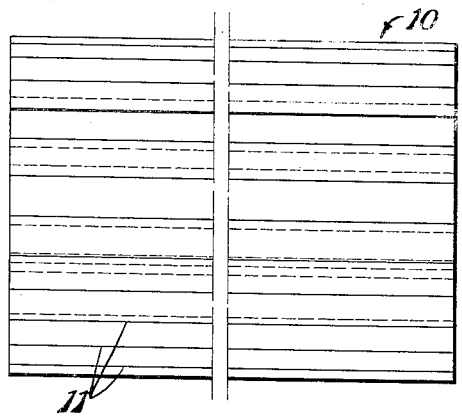
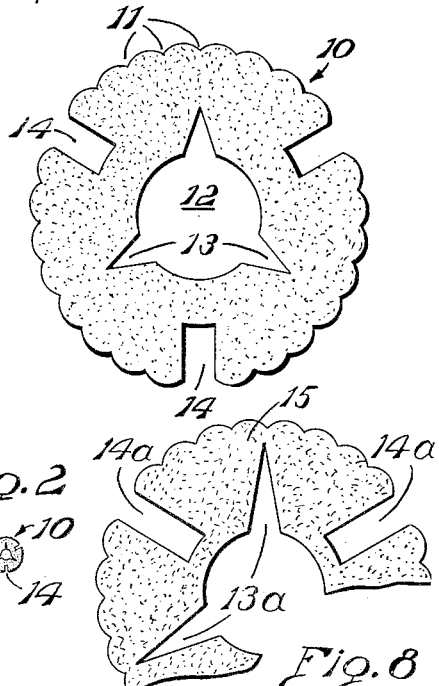
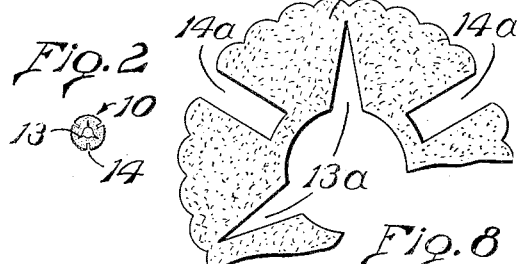
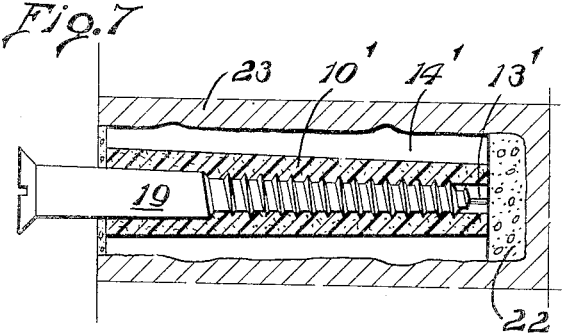
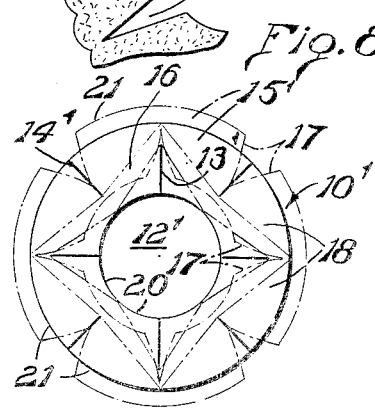
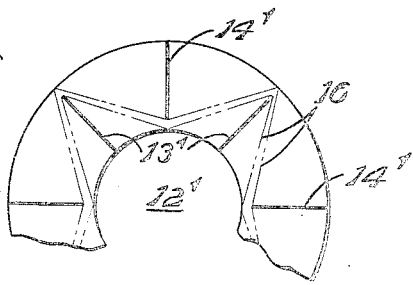
INVENTOR
George M. Scott
BY
Beau, Brooks, Buckley & Beau
ATTORNEYS Patented Oct. 30, 1951

2,573,498

UNITED STATES PATENT OFFICE 2,573,498

WALL PLUG

George M. Scott, Fort Erie, Ontario, Canada

Application February 1, 1946, Serial No. 644,711
In Great Britain April 20, 1945

1 Claim. (Cl. 85—2.4)

This invention relates to improvements in wall plugs as described in the present specification and illustrated in the accompanying drawings that form a part of the same.

The invention consists essentially of the novel features of construction as pointed out broadly and specifically in the claim for novelty following a description containing an explanation in detail of an acceptable form of the invention.

The objects of the invention are to devise a wall plug which will expand when a screw or other fastening member is inserted therein, and thereby ensure a tight hold of the fastening member into the wall surface; to furnish a plug that will be made of light and economical material, easily constructed and simple in its actual operation; to avoid the marring of walls constructed of plaster or equivalent substances (which is caused by the driving of screws or other fastening members thereinto ordinarily causing the surface surrounding the apertures being made to crumble and which apertures, at the best, provide a very unstable gripping surface for the fasteners) by supplying an expanding plug which can be inserted into an aperture made in the wall and into which plug a fastening member can be introduced, the said plug providing a tight gripping surface for the fastening member and also minimizing the danger of the fastening member coming loose; and generally to provide a wall plug that will be durable in construction, efficient for its purpose, and inexpensive to manufacture.

In the drawings:

Fig. 1 is a side elevational view of the wall plug;

Fig. 2 is an end view of a wall plug;

Fig. 3 is an enlarged fragmentary side elevational view of the wall plug;

Fig. 4 is an enlarged end view of the wall plug;

Fig. 5 is an enlarged view showing a modified form of the wall plug;

Fig. 6 is a similar view, in fragment, but accentuating further the overlapping relation of the slits;

Fig. 7 is a view partly in section showing a practical application of the improved wall plug; and Fig. 8 is a fragmentary view of another modification.

Like numerals of reference indicate corresponding parts in the various figures.

Referring to the drawings, the wall plug as indicated by numeral 10 is formed of plastic or other composite material and consists of an elongated member somewhat circular in cross section and having an undulating or rough exterior surface 11. The elongated member is provided with a longitudinal bore 12 and the bore may be constructed so as to be triangular in cross section and forming longitudinal open slits 13 extending at the junction of the triangular sides and these slits extending outwardly but terminating short of the exterior surface of the elongated member. Naturally the contour of the bore may be changed in accordance with the best shop practice.

Alternating with the slits 13 are external open slits or grooves 14 which extend inwardly, but terminate short of the interior surface of the bore 12.

The elongated member is also provided with internal and external slits and so arranged as to be alternately located around the circumference of the member and, owing to the fact that the plug is made of plastic material, it will readily be seen that when the plug is introduced into an orifice in a wall and a fastening member is screwed into the bore of the plug, this will cause the plug sections formed by the longitudinal slots to spread outwardly and tightly abut the surface which forms the hole or aperture in the wall.

This is due to the fact that the alternating slits overlap at their inner ends, as accentuated at 13a and 14a in Fig. 8, to define the sections 15. The expanding action of these plug sections is more clearly depicted in Figs. 5 and 6 wherein four external slits 14' extend inwardly short of the bore 12', but in overlapping radial relation to four outwardly extending internal slits 13' to form the expansible sections 15'. The plug 10' is therefore provided with a continuous or endless body portion of accordion design, as indicated by the double dot and dash lines 16, with the leaves or pleats of the accordion form folding and unfolding. The zigzag body portion is uninterrupted by the slits, and as the sections expand radially the adjoining leaves of the folds will unfold and the internal and external slits will tend to open more or less to the position indicated by the dot and dash lines 17. This unfolding is accomplished readily until the zigzag annulus assumes a substantially circular shape at which time further expansion will be restrained without circumferential and abnormal distention.

Each section (15, 15') has two radial thrust receiving portions 18 which are separated by a slit 13' and actually constitute in effect the folding leaves of the accordion structure. Therefore, the thrust receiving portions are substantially free for radial movement under the expanding action of the screw or bolt 19. Each folding leaf is hinged to the two adjacent flanking leaves and has a bolt engaging inner face 20 and a wall engaging outer face 21.

In use, with the bolt turned into the wall plug, the faces 21 are pressed outwardly into intimate contact with the encircling wall of the recess or socket 22 in the wall 23 to effect a firm anchorage. The wall plug may be economically manufactured, as by an extrusion process, the tubular stock being produced in long pieces and severed into plug lengths. Or, the plug may be manufactured from metal, such as lead and like pliable metal as well as other material suitable for interlocking with a wall. Further, the plug may be shaped otherwise than by extrusion to give it the accordion-like expansion, for which purpose any number of slits may be employed. By reason of the hinged connections between the leaves 18 the radial thrust from the bolt is received by the leaves independently of one another and without an injurious circumferential stretching of the intermediate and uninterrupted body portion 16. In the normally unexpanded state of the plug the slits may be substantially closed, as shown in Figs. 5 and 6, or they may be open or of substantial width, as depicted in Fig. 4.

Although the plug has been described as applicable to a wall surface it is, of course, understood that it is applicable to other surfaces such as, for example, in the construction of various articles made of plaster or other materials where it is necessary and desirable to use plugs of this description.

What is claimed is:

A non-metallic wall plug comprising a tubular body having radial slits extending inwardly from the outer circumference of the body short of the inner circumference of the bore of the body, and other radial slits circumferentially offset from the first slits and extending from the bore outwardly short of the outer circumference of the body but to a greater radial distance than the inward extent of the outer slits, the outer and inner slits extending throughout the length of the body and lying substantially in radial planes.

GEORGE M. SCOTT.

REFERENCES CITED

The following references are of record in the file of this patent:

UNITED STATES PATENTS

| Number | Name | Date |
|---|---|---|
| 1,570,234 | Feldmar | Jan. 19, 1926 |
| 1,930,361 | Kilmer | Oct. 10, 1933 |
| 1,935,336 | Sluyter | Nov. 14, 1933 |
| 2,172,125 | Hamill | Sept. 5, 1939 |